United States Patent
Funane (10) Patent No.: US 9,826,036 B2
(45) Date of Patent: Nov. 21, 2017

(54) INFORMATION PROCESSING TERMINAL AND CONTROL METHOD

(71) Applicant: CANON KABUSHIKI KAISHA, Tokyo (JP)

(72) Inventor: Nao Funane, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 14/694,433

(22) Filed: Apr. 23, 2015

(65) Prior Publication Data

US 2015/0312345 A1    Oct. 29, 2015

(30) Foreign Application Priority Data

Apr. 25, 2014    (JP) .................. 2014-091810
Jun. 20, 2014    (JP) .................. 2014-127539

(51) Int. Cl.
| | | |
|---|---|---|
| G06F 15/16 | (2006.01) | |
| H04L 29/08 | (2006.01) | |
| G06F 3/0481 | (2013.01) | |
| G06F 21/41 | (2013.01) | |
| G01C 21/32 | (2006.01) | |
| G06F 9/445 | (2006.01) | |
| H04L 29/06 | (2006.01) | |

(52) U.S. Cl.
CPC .......... *H04L 67/1097* (2013.01); *G01C 21/32* (2013.01); *G06F 3/04817* (2013.01); *G06F 8/65* (2013.01); *G06F 21/41* (2013.01); *H04L 67/02* (2013.01); *H04L 67/42* (2013.01)

(58) Field of Classification Search
CPC ..... G06F 3/04817; G06F 21/41; G01C 21/32; H04L 67/02
USPC .............................. 709/203; 701/532; 726/8
See application file for complete search history.

(56) References Cited

U.S. PATENT DOCUMENTS

| | | | |
|---|---|---|---|
| 2004/0049541 A1* | 3/2004 | Swahn ............... | G06F 3/04817 709/203 |
| 2006/0080032 A1* | 4/2006 | Cooper ................ | G01C 21/32 701/532 |
| 2010/0296375 A1 | 11/2010 | Imoto | |
| 2012/0206757 A1* | 8/2012 | Kawabata .............. | H04L 67/02 358/1.14 |
| 2013/0036460 A1* | 2/2013 | Lau ........................ | G06F 21/41 726/8 |
| 2013/0219383 A1* | 8/2013 | Hilerio ..................... | G06F 8/65 717/178 |

FOREIGN PATENT DOCUMENTS

| | | |
|---|---|---|
| JP | 2012-068756 A | 4/2012 |
| JP | 2012-168778 A | 9/2012 |

* cited by examiner

*Primary Examiner* — Kyung H Shin
(74) *Attorney, Agent, or Firm* — Canon USA, Inc. I.P. Division (57) ABSTRACT

In the present invention, as functions of a web browser, the web browser extracts, among local storage data stored in a storage area, local storage data as a deletion candidate according to one or more conditions, and deletes the local storage data extracted as the deletion candidate from the storage area.

23 Claims, 9 Drawing Sheets

```
CACHE MANIFEST
# 2014-02-10:v1

CACHE:
/favicon.ico
index.html
stylesheet.css
images/logo.png
scripts/main.js

NETWORK:
network.html
login.php

FALLBACK:
/ fallback.html
```

| DATA | SIZE | STORAGE DATE |
|---|---|---|
| ddd.com | 2 MB | 2014/2/10 |
| eee.com | 3 MB | 2013/6/5 |
| fff.com | 1 MB | 2014/4/10 |
| ggg.com | 500 KB | 2014/8/30 |

FIG. 9B

| DATA | SIZE | STORAGE DATE | EXCLUSION FLAG |
|---|---|---|---|
| ddd.com | 2 MB | 2014/2/10 | 0 |
| eee.com | 3 MB | 2013/6/5 | 1 |
| fff.com | 1 MB | 2014/4/10 | 0 |
| ggg.com | 500 KB | 2014/8/30 | 0 |

INFORMATION PROCESSING TERMINAL AND CONTROL METHOD

BACKGROUND OF THE INVENTION

Field of the Invention

The present invention relates to a technique for providing a mechanism of data storage for a new web browser in HyperText Markup Language (HTML) 5.

Description of the Related Art

As web applications have become highly functional, various types of function extension have been examined in HTML 5. One of such extended functions is an Application Cache function of caching a file on a web server into a storage area for a web browser. Other extended functions include functions such as WebStorage and Indexed Database (Indexed DB) for storing data into the storage area for the web browser.

For WebStorage, data can be automatically stored in a storage area (a storage area for a web browser) of an information processing terminal such as a personal computer (PC) or a smartphone from the web server providing a website, at a timing when the website is browsed. Such an extended function enables a service provided by the website to be used by using cached data, even if the PC or a mobile terminal browsing the website is disconnected from a network, i.e., offline.

On the other hand, conventionally, there has been a technique for caching, into a storage area for the web browser, content provided by a website although a data amount and the number of data types are smaller than those in the above-mentioned extended function. General web browsers may include one that provides a function of deleting the cached data. More specifically, a user can manually issue an instruction to collectively delete cached data from a setting menu in the web browser. In addition, some web browsers may provide a function of deleting data corresponding to a domain of a website selected by the user.

A method for deleting unnecessary cached data includes a conventional technique as discussed in Japanese Patent Application Laid-Open No. 2012-168778. The conventional technique registers a web application in an image forming apparatus, caches a file required during use of the web application, and deletes, when registration information of the web application is deleted, a related cache together with the registration information.

For the above-mentioned function extension in HTML 5, a capacity of data that can be stored in WebStorage is provided with a limit value for each combination of a protocol called an origin, a host name, and a port. A capacity limit is also provided for entire WebStorage. As a formal specification related to the HTML 5, there is no function of deleting data stored in a local storage area upon the exceedance of a time limit. Accordingly, unless an explicit deletion procedure is taken by the website which causes the data to be stored, the data stored using the above-mentioned extended function remains in the local storage area of a terminal.

In the above-mentioned specification, the following problems may arise. When the user browses a new website, for example, if a data amount already exceeds a storage capacity of WebStorage, a service provided by the new website may be unable to be normally used. When the amount of stored data increases even if it has not reached a capacity limit value, acquisition of data from WebStorage and storage of new data become slow. If a storage capacity is small (e.g., in the case of the mobile terminal), the data stored in WebStorage occupies a large portion of the entire storage capacity of the mobile terminal so that data of another application cannot be stored.

If the use of the above-mentioned various extended functions for storing a file or data into the storage area for the web browser from the website, such as WebStorage, becomes common in the future, it is assumed that an amount of the stored data increases. Thus, the above-mentioned problems become more likely to occur. Therefore, there is a need for a method for appropriately deleting data stored in the storage area for the web browser using the extended functions.

In the above-mentioned technique discussed in Japanese Patent Application Laid-Open No. 2012-168778, when a user deletes a web application, it can be determined that the web application itself is not required. Therefore, related cache data can be deleted without any particular problem.

On the other hand, the file or the data locally stored using the above-mentioned extended functions such as WebStorage is stored during web browsing. An operation of browsing or closing the website in the web browser is considered to be greatly different in intention from an operation of registering or deleting (installing or uninstalling) the web application. More specifically, even if the user closes the website or ends the web browser once after browsing the website, the user may browse the website again when using the web browser next time. In other words, it cannot be determined that the website will not be used in the future, simply based on an action of closing the website in the web browser or ending the web browser. Accordingly, even if the above technique discussed in Japanese Patent Application Laid-Open No. 2012-168778 is considered, it seems difficult to perform control for appropriately deleting the file or the data locally stored using the above-mentioned extended functions such as WebStorage.

SUMMARY OF THE INVENTION

The present invention is directed to a method for appropriately deleting data in a function of storing various types of data in a local storage area of an information processing terminal from a website, without hampering convenience thereof.

According to an aspect of the present invention, an information processing terminal in which a web browser operates, the web browser having a function of storing, as local storage data, data designated by a website into a storage area for the web browser, in response to calling of the website, includes an extraction unit configured to extract, from among local storage data stored in the storage area, local storage data as a deletion candidate according to one or more conditions, a presentation unit configured to present a screen including identification of the local storage data extracted as the deletion candidate, and a deletion unit configured to delete the local storage data extracted as the deletion candidate from the storage area, in response to an instruction via the screen.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings. Each of the embodiments of the present invention described below can be implemented solely or as a combination of a plurality of the embodiments or features thereof where necessary or where the combination of elements or features from individual embodiments in a single embodiment is beneficial.

Figure 1:
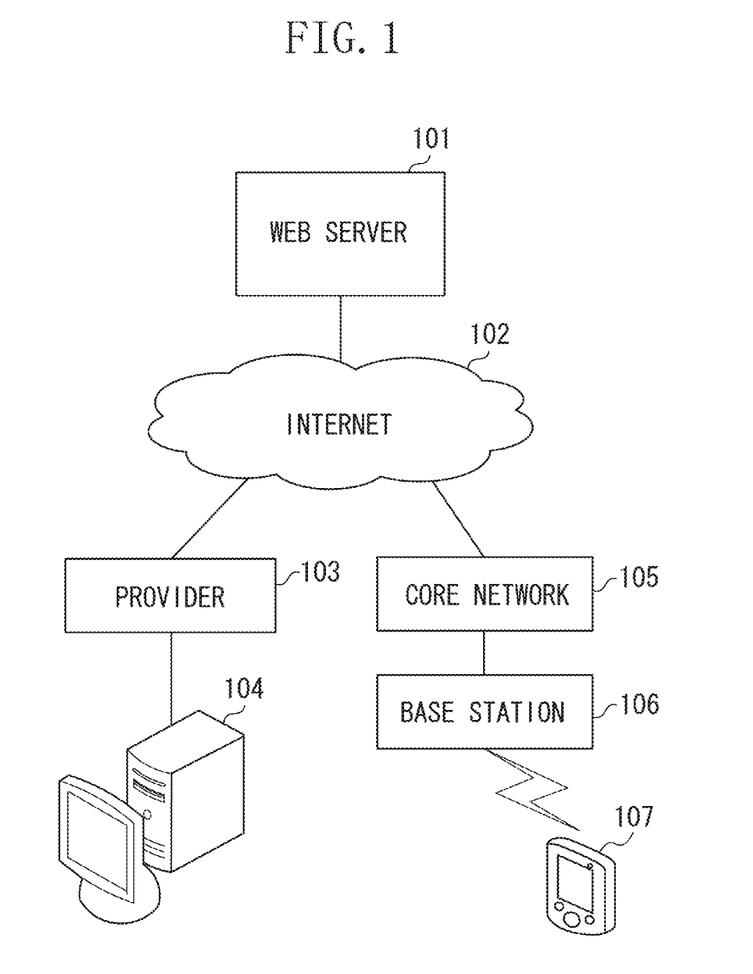
FIG. 1 illustrates a network configuration.

FIG. 1 illustrates an example of a network configuration of a system according to a first exemplary embodiment.

An information processing apparatus 104 refers to, for example, a personal computer (PC) that communicates with a provider 103 over an optical line or the like, and is connected to the Internet 102 via the provider 103. An information processing terminal 107 is a terminal, such as a tablet terminal or a smartphone, which wirelessly communicates with a base station 106, and is connected to the Internet 102 via a core network 105. Examples of the information processing terminal 107 further include a desktop PC. A web server 101 is a system that provides a website to each information processing terminal via the Internet 102.

Figure 2:
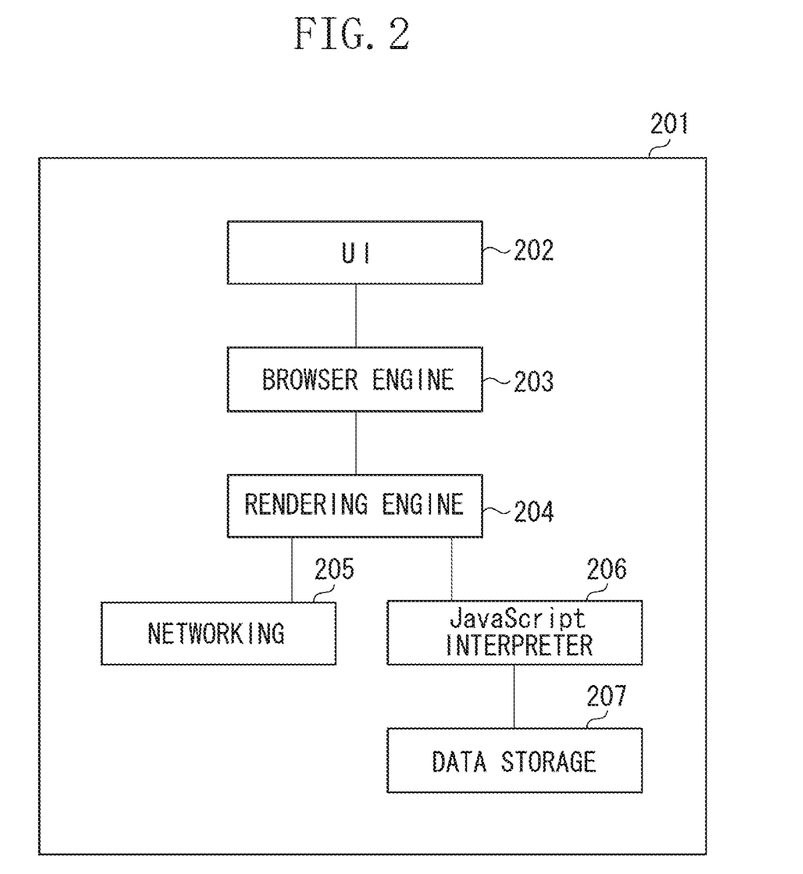
FIG. 2 is a block diagram illustrating a configuration of a web browser.

FIG. 2 is a block diagram illustrating a configuration of a web browser 201 that has implemented the present invention.

A user interface (UI) 202 is a web browser UI including Uniform Resource Locator (URL) display, bookmark display, and web browser setting menu display. A rendering engine 204 displays required content such as Hypertext Markup Language (HTML). A browser engine 203 performs processing between the UI 202 and the rendering engine 204. A networking 205 receives a network call such as a Hypertext Transfer Protocol (HTTP) request. A JavaScript (registered trademark) interpreter (hereinafter referred to as JS interpreter) 206 analyzes and executes a JavaScript (registered trademark) code.

A data storage 207 performs control of storing, into a storage device, data of Application Cache, WebStorage, and Indexed DB based on a storage specification related to Cookie or HTML 5. Hereinafter, the data stored by the data storage 207 is generically called local storage data. Operations such as data storage and deletion by the data storage 207 are controllable according to JavaScript (registered trademark).

Figure 3A:
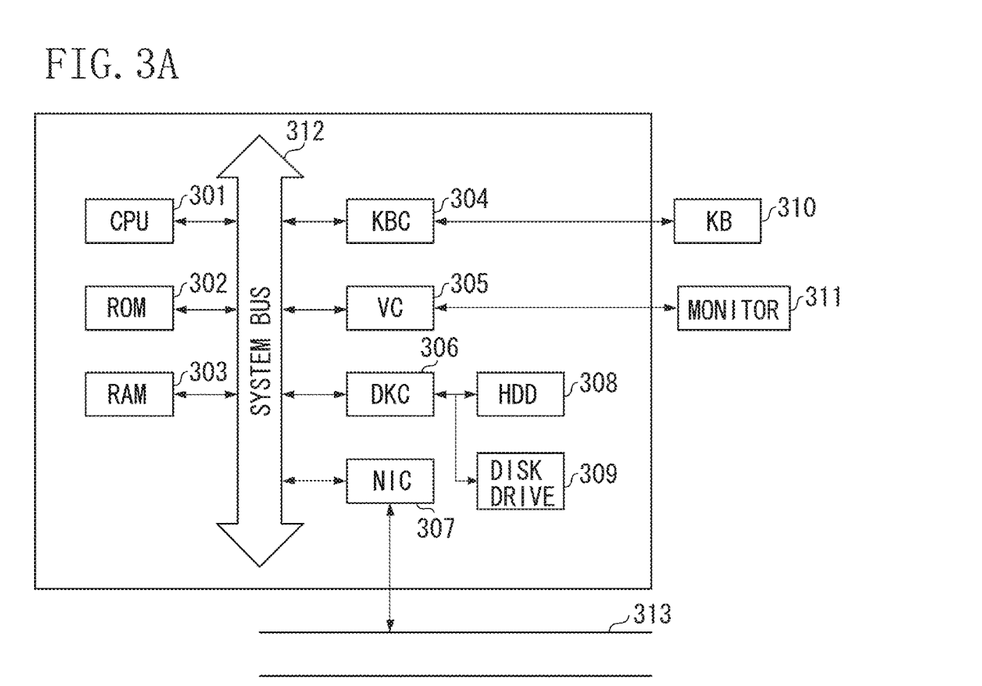
FIGS. 3A and 3B each illustrate a hardware configuration.

FIG. 3A is a block diagram illustrating a hardware configuration of the information processing apparatus 104.

A central processing unit (CPU) 301 executes programs stored in a read-only memory (ROM) 302 and a hard disk drive (HDD) 308 serving as a storage device, using a random access memory (RAM) 303 as a work memory, and controls each of configurations described below, via a system bus 312. The HDD 308 stores an operating system (OS) and various types of programs and data. The CPU 301 accesses the HDD 308 and a disk drive 309 via a disk controller (DKC) 306, and installs various types of programs in the HDD 308. The CPU 301 can also communicate with another computer over a network 313, via a network interface card (NIC) 307.

The CPU 301 displays a UI on a monitor 311 via a video card (VC) 305 according to the programs. A user operates a keyboard (KB) 310 and a pointing device such as a mouse, to issue an instruction and provide an input to the UI. The CPU 301 receives the instruction and the input from the user via a keyboard controller (KBC) 304, and performs various types of processing according to the instruction and the input from the user.

Figure 3B:
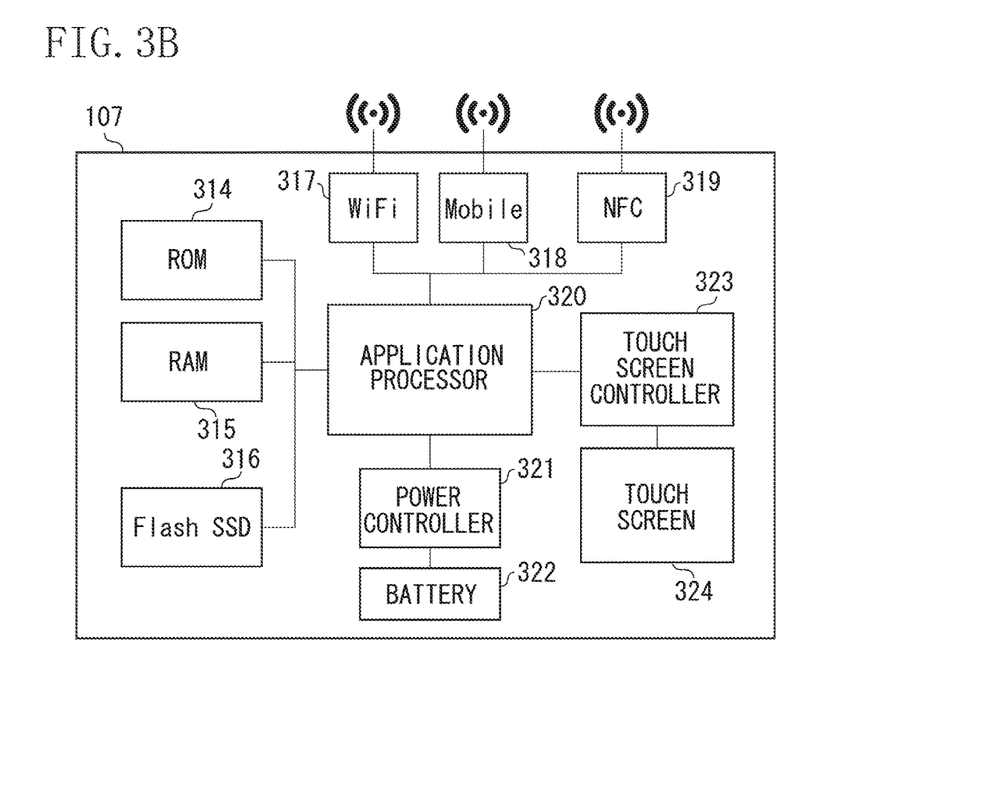

FIG. 3B is a block diagram illustrating a hardware configuration of the information processing terminal 107 in which the web browser 201 can operate.

In FIG. 3B, the information processing terminal 107 includes an application processor (hereinafter referred to as AP) 320, a ROM 314, a RAM 315, and a storage device 316 such as Flash Solid State Drive (SSD). The AP 320 executes software stored in the ROM 314 and the storage device 316, and integrally controls devices connected to the AP 320. The RAM 315 functions as a main memory or a work area of the AP 320. The storage device 316 stores an operating system, various types of applications such as a web browser, database data, and a user file. A touch screen controller 323 controls a touch screen 324 connected thereto.

A wireless local area network (LAN) control unit 317, a mobile communication control unit 318, and a near field communication control unit 319 respectively control wireless LAN communication such as Wireless Fidelity (WiFi), mobile communication, and near field communication. Further, in the information processing terminal 107, a power source control unit 321 controls charging of a rechargeable battery 322 and manages a remaining battery capacity.

FIG. 3B illustrates an example of a configuration of the information processing terminal 107 to which the present invention is applicable. Therefore, the present invention is applicable even if the information processing terminal 107 further includes hardware (not illustrated) for providing network connection and hardware such as a camera (not illustrated) or even if it does not include some components such as the near field communication control unit 319.

Figure 4:
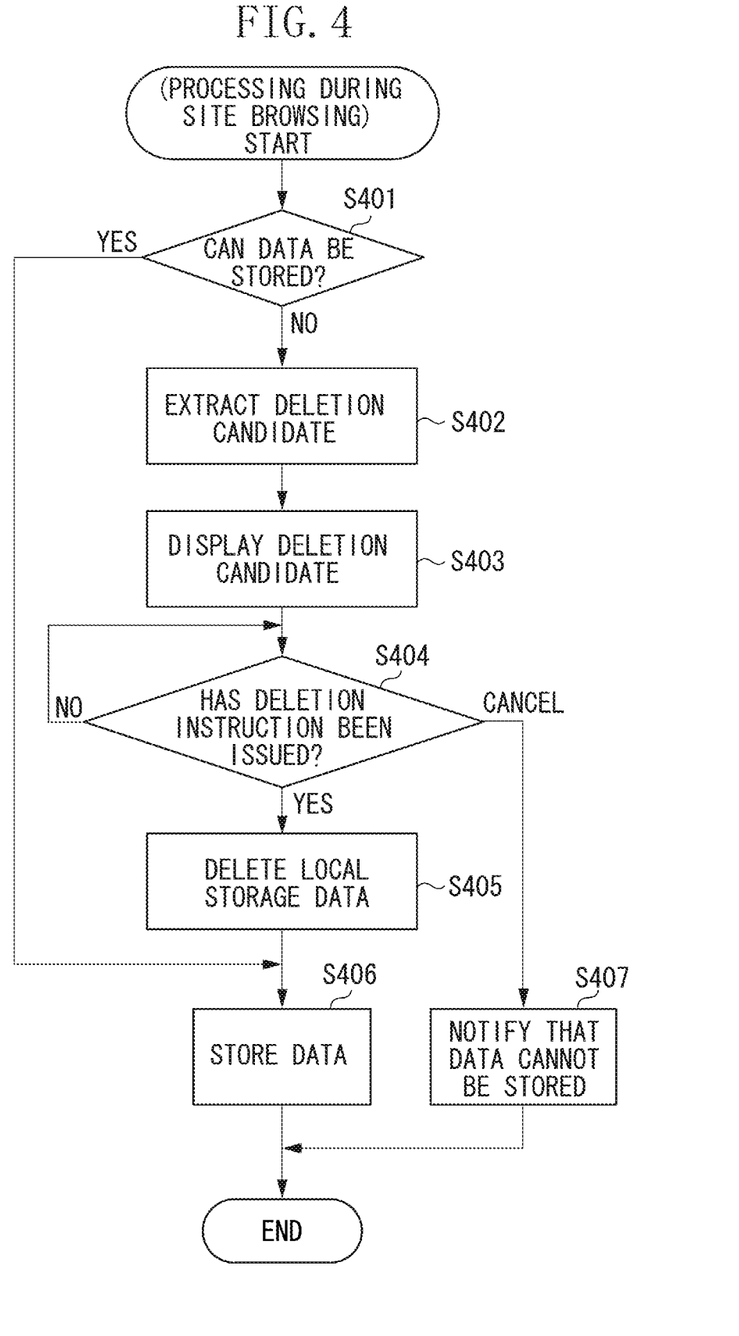
FIG. 4 is a flowchart of processing for deleting local storage data.

FIG. 4 is a flowchart for illustrating processing for deleting local storage data by the web browser 201 that operates in the information processing terminal 107. Through the processing, when the user browses a page provided by a new website, if it is determined that the data storage 207 cannot store data, unnecessary local storage data can be deleted to increase an available storage area.

When the user operates the UI 202 to issue an instruction to display the page provided by the website, the data storage 207 stores data designated by the website. The web browser 201 performs, in parallel, respective types of control for browsing the page provided by the website and for storing the data designated by the website. More specifically, when the web browser 201 requests the website to provide a page, the data storage control is started. The web browser 201 can also be configured to issue a confirmation notification to the user before starting to store the data. Before describing details of FIG. 4, the description will be given of a mechanism of storing the data from the website by the web browser 201.

In this case, for WebStorage serving as an extended function related to HTML 5, when the web browser 201 calls a website (requests a web page), the JS interpreter 206 executes a JavaScript (registered trademark) code mounted on the web page in the website. According to the execution of the JavaScript (registered trademark) code, the data storage 207 stores data downloaded from a web server providing the website into a storage area for the web browser 201. The stored data can be used via the web browser 201 even if the information processing terminal 107 goes offline, and its value can also be edited and further stored. In this case, when the information processing terminal 107 goes online again, data including the edited value can also be transmitted to the web server providing the website.

For Application Cache, the web browser 201 acquires a necessary file or data from a web server providing a website, and stores the acquired file or data in its own storage area, according to description of a manifest file prepared in the website. The manifest file is downloaded into the web browser 201 when the website is called (a web page is requested).

Figure 5:
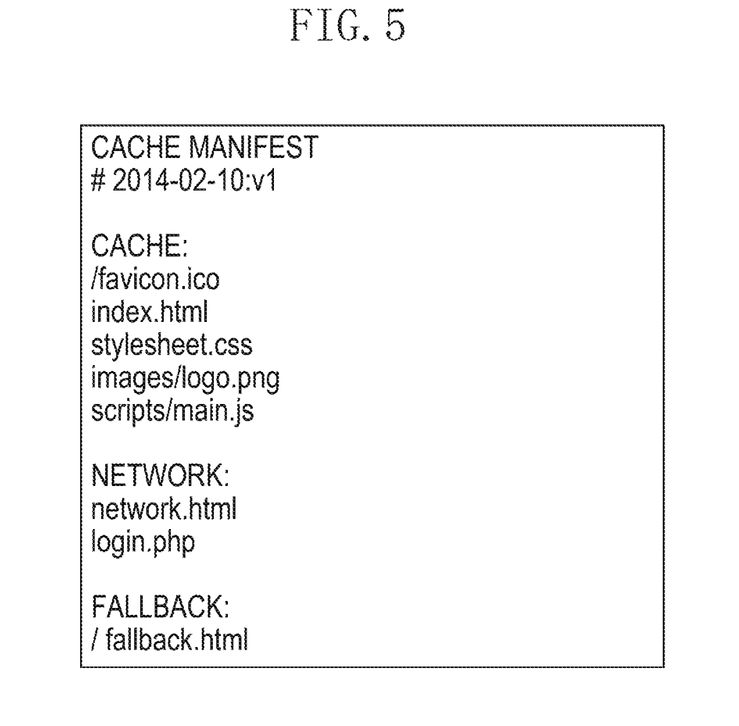
FIG. 5 illustrates an example of a manifest file.

FIG. 5 illustrates an example of the manifest file. A character string "CACHE MANIFEST" needs to be described on the first row.

Resources listed after a header "CACHE:" are explicitly stored in a storage area of the web browser 201 after a website is first accessed and the manifest file is downloaded.

Resources which require connection to a web server are listed after a header "NETWORK:". The web browser 201 always refers to these listed resources on the web server, not to offline cached resources.

A page to be displayed when the web browser 201 cannot access the resource is described after a header "FALLBACK:".

A row beginning with "#" is a comment row.

Application cache is updated only when an administrator who operates the website changes the manifest file itself. Therefore, an image file is not cached again when edited with its file name unchanged. In this case, a new file is cached by writing and updating an update date and a version number on the comment row.

When a user browses the website again, the web browser 201 uses the cached resources described to be used, according to the manifest file without acquiring the cached resources again from the web server.

Even if the terminal goes offline, a service provided by the website can be used using cache data managed by the web browser 201, and data being edited while offline can be synchronized with data of the website when the terminal goes online again.

The description will return to the processing illustrated in FIG. 4.

In step S401, the web browser 201 calculates an available data storage capacity, and determines whether data from a website can be stored. If the data from the website can be stored (YES in step S401), the processing proceeds to step S406. If the data from the website cannot be stored (NO in step S401), the processing proceeds to step S402.

If the data cannot be stored, in step S402, the web browser 201 extracts, from among local storage data stored by the data storage 207, deletion candidate data. In step S403, the web browser 201 displays the local storage data extracted in step S402, via the UI 202.

Figure 6:
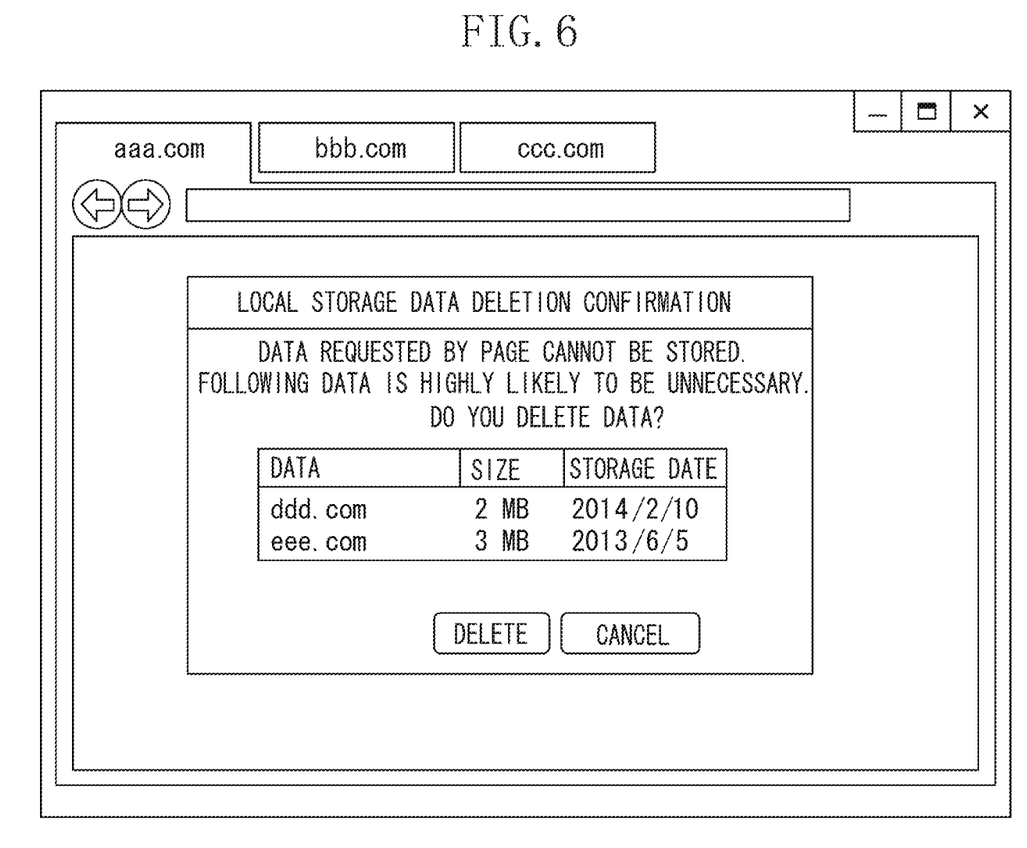
FIG. 6 illustrates an example of a user interface (UI) for confirming deletion of local storage data.

FIG. 6 illustrates an example of a screen for prompting a user to delete unnecessary local storage data. On the screen, local storage data extracted as a deletion candidate in step S402 is presented and displayed in a deletable manner, so as to ensure a capacity required by a currently-browsed website for storing data. Deletion candidates are displayed in an identifiable manner by using a name of a website which has instructed storing of the data, and its URL, and their respective sizes are displayed together. As an example of display method, deletion candidates can be displayed in descending order of their deletion priorities, starting from a candidate with the highest deletion priority. As an example of deletion priority, local storage data pieces extracted as deletion candidates are determined to be higher in the deletion priority in chronological order of dates and times on which they are stored. The user can recognize and delete the local storage data that is expected to be unnecessary by the web browser 201.

In step S404, the web browser 201 waits until the user inputs a determination result, and determines whether it has received the press of a deletion button by the user via the screen illustrated in FIG. 6. If the web browser 201 receives the press of the deletion button (YES in step S404), then in step S405, the web browser 201 deletes the corresponding local storage data.

In step S406, the web browser 201 stores the data requested by the page-browsed website. More specifically, as described above, the data storage 207 stores data or a file downloaded from the website into a recording area prepared for the web browser 201, according to description of a manifest file and execution of a JavaScript (registered trademark) code.

If the web browser 201 receives the press of a cancel button by the user via the screen illustrated in FIG. 6 (CANCEL in step S404), then in step S407, the web browser 201 notifies the user via a display that the data requested by the page-browsed website cannot be stored, and the processing ends.

Figure 9A:
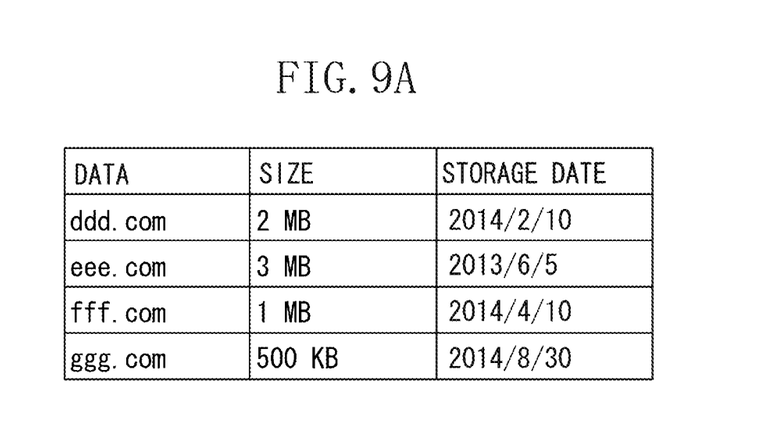
FIGS. 9A and 9B each illustrate an example of a table for managing a local storage data deletion candidate.

FIG. 9A illustrates an example of a table for managing a local storage data deletion candidate.

In the present invention, when the data storage 207 stores data or a file downloaded from the website, a date (a date and time) on which storage processing has been performed is recorded as a storage date (a storage date and time) in the table illustrated in FIG. 9A, together with information for identifying the website. In the table, a total data size is also managed for each site download (origin).

In step S402 described above, the web browser 201 first extracts the local storage data pieces in ascending order of their storage dates and times. The web browser 201 continues to extract the local storage data pieces until the sum of the sizes of the extracted local storage data pieces reaches a size sufficient for ensuring a storage capacity requested by the page-browsed website, and considers the extracted local storage data pieces as deletion candidates.

Application Example of First Exemplary Embodiment

In the first exemplary embodiment, the description has been given of an example in which, if data provided by the website cannot be stored when a new website is called, deletion candidates are displayed. As its application example, control for prompting a user to delete local storage data determined to be unnecessary by the web browser 201 can be performed at other timings.

For example, at a stage where it is identified that the data storage amount is to reach a predetermined amount (e.g., approximately 70%) of an available storage capacity for the web browser 201, control for providing deletion candidates to the user can be performed. In this case, a threshold value representing the predetermined amount is set in the web browser 201. Such control enables the deletion candidates to be provided to the user at an earlier stage, and can prompt the user to delete the unnecessary local storage data at an earlier stage than in the first exemplary embodiment.

The deletion candidates may be extracted and presented to the user at both timings, i.e., when it is determined that the data provided by the website cannot be stored, and at the timing exemplified in the application example.

Modified Example of First Exemplary Embodiment

The above-mentioned exemplary embodiment uses the storage date and time as a condition for determining the deletion candidates by the web browser 101. As a modified example, other determination criteria will be described.

For example, deletion candidates may be determined by any one of conditions described below as "example of condition" or a combination of a plurality of conditions. In addition, when the web browser 201 provides deletion candidates to the user, all local storage data pieces matching conditions described below may be displayed as deletion candidates, or local storage data pieces matching a plurality of conditions may be displayed as deletion candidates. Alternatively, the conditions may be respectively assigned priorities, and a predetermined number of local storage data pieces may be displayed as deletion candidates in descending order of their priorities.

Example of Condition

1. Storage Date and Time
Local storage data pieces which have been stored by the data storage 207 on older dates and times are to be preferentially deleted. At this time, a plurality of local storage data pieces may be determined as deletion candidates in ascending order of their storage dates and times. WebStorage has no function of recording a data storage date (a data storage date and time). Thus, the data storage 207 records local storage data while associating the data with its storage date (storage date and time), separately from an area for storing target data of WebStorage. Such processing enables the web browser 201 to determine the deletion candidates.
2. Number of Times of Browsing
Among websites having instructed storing of local storage data, local storage data corresponding to a website having a smaller number of times of browsing is to be preferentially deleted.
3. Final Browsing Date and Time
Among websites having instructed storing of local storage data, local storage data corresponding to a website having an older final browsing date (browsing date and time) is to be preferentially deleted.
4. Data Size
Local storage data having a larger size is to be preferentially deleted.
5. Data Related to "Prefetched Page" and Page Having No Browsing History by User
Some web browsers have a function of prefetching (accessing in the background) a page of another website that is linked from a page of a website browsed by a user. For the page accessed in prefetching processing, local storage data may be stored as well, even though the user does not actually browse the page. When storing local storage data, the data storage 207 additionally records that the local storage data is data stored according to the prefetching processing. Such recording is performed like the above-mentioned recording of the storage date. While extracting deletion candidates, the web browser checks a browsing history of a page of a website corresponding to the data stored according to the prefetching processing, and if the page of the website has no browsing history, determines that the stored data is to be deleted.
6. Data Related to Domain Different from Domain of Page Directly Opened
Some websites may have an inline frame provided in its page, to display a page having another domain. In this case, the data storage 207 may store local storage data related to a domain other than a domain of a page directly opened by a user. The page having the other domain may be a page about information not required by the user, such as an advertisement, for example. Thus, local storage data, which has been designated to be stored by the page having the other domain, is to be preferentially deleted.
7. Data Related to Page Deleted from Bookmark
When a user deletes a specific website from a bookmark managed by a web browser, the web browser records local storage data corresponding to the specific website as deletion candidates. Such recording is performed like the above-mentioned recording of the storage date.
8. Data of Session Storage
WebStorage has two types of data storage forms, i.e., localStorage in which data remains in a local storage area of the information processing terminal 107 even if a web browser is closed, and sessionStorage in which data is temporarily stored in a local storage area and erased upon a web browser being closed. In this condition, data of sessionStorage serving as temporary storage data is to be preferentially deleted.

As a method for assigning priorities to local storage data deletion candidates, the above-mentioned conditions may be combined with one another when used. For example, when the condition 1 and the condition 5 are combined, if there is a plurality of local storage data pieces related to a "prefetched page" and a page having no browsing history by a user, local storage data having an older storage date may be determined to be higher in priority.

The apparatus can be configured to prompt the user to specifically set a condition used for a web browser determining deletion candidates, or a display method, via a setting screen of the web browser. The deletion candidates can also be flexibly displayed so that they can be easily grasped by the user, for example, for each origin, for each website, or for each page provided by the website.

In the first exemplary embodiment, the description has been given of an example in which a list of local storage data pieces to be deleted is displayed on a web browser, and a user selects whether the local storage data pieces are to be collectively deleted. In a second exemplary embodiment, a user can select, from among deletion candidates, the local storage data to be deleted.

Figure 7:
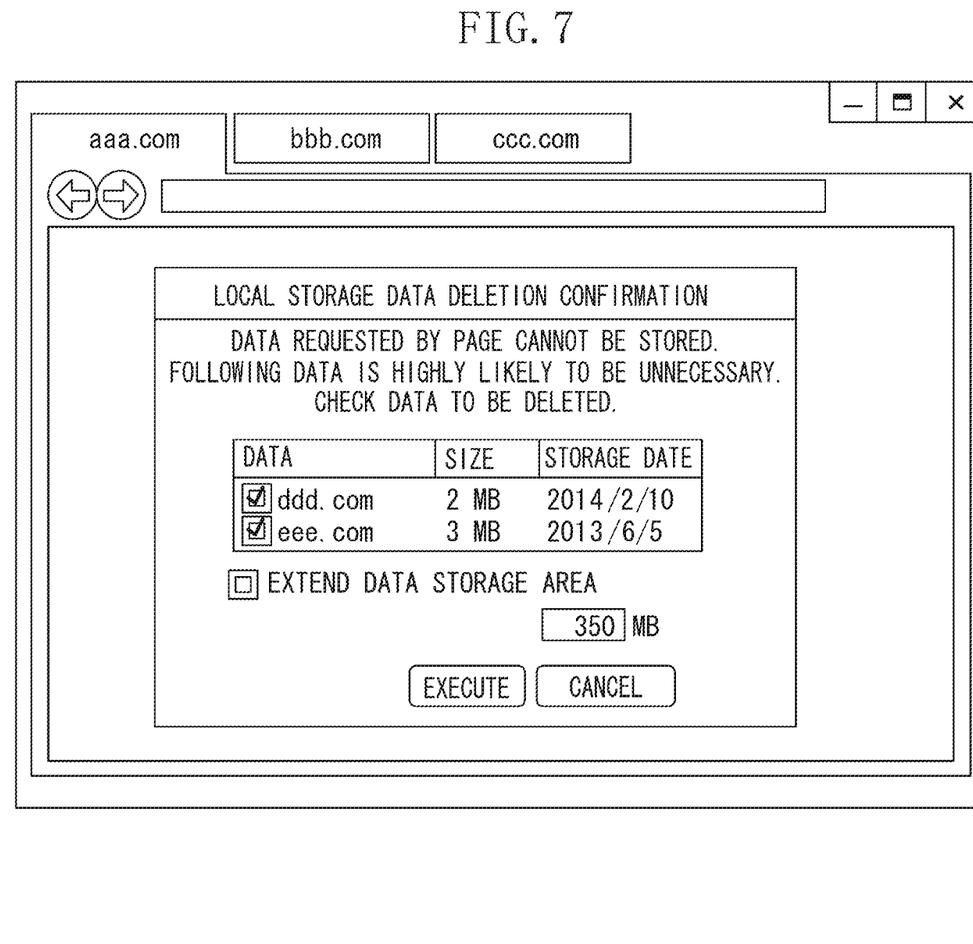
FIG. 7 illustrates an example of a UI for confirming deletion of local storage data.

FIG. 7 illustrates an example of a screen for presenting deletion candidates determined and extracted by a web browser as described in the above-mentioned exemplary embodiment, and making a user select the local storage data to be actually deleted, from among the presented deletion candidates. The web browser 201 deletes only local storage data selected and designated on the screen, at a timing in step S405 described above, for example.

As illustrated in FIG. 7, an option for extending an available storage area for local storage data is further provided on this screen. The option is used when the user determines that the displayed local storage data cannot be deleted as a result of confirming the deletion candidates, and desires to use a website that is being browsed. If "extend data storage area" is selected, the web browser 201 extends an available data storage area to a designated capacity within the designated user's authority.

Figure 9B:
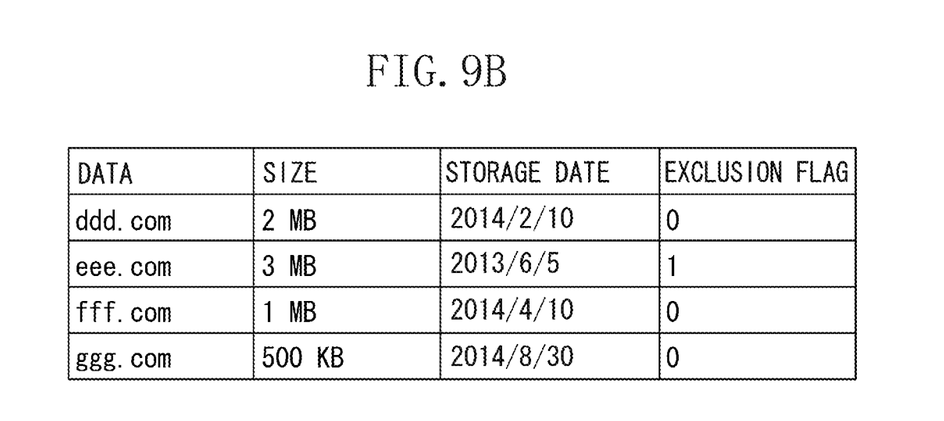

FIG. 9B illustrates a management table of a case where local storage data to be deleted is displayed so as to be selectable from among deletion candidates, as illustrated in FIG. 7. The data storage 207 records local storage data which is not selected by a user as a deletion target, by activating an exclusion flag therefor. The web browser 201 can prevent the local storage data, for which the exclusion flag is activated, from being displayed as the deletion candidate on the screen illustrated in FIG. 7.

In the first exemplary embodiment, the description has been given of an example in which local storage data is deleted in response to a deletion instruction from a user. In a third exemplary embodiment, the description will be given of control for automatically deleting local storage data if a data amount exceeds an available storage area of local storage data.

On a setting screen provided by a web browser, an item for selecting whether to set "automatic deletion" is provided. When a user sets "automatic deletion", the web browser automatically deletes extracted local storage data deletion candidates by a required capacity in the order of their deletion priorities, at a timing when the local storage data needs to be deleted. The timing when the local storage data needs to be deleted includes a case where it is determined, when a new site is browsed, that a data amount is to exceed an available storage capacity by storing data related to the site, and a case where it is determined that an amount of stored data has exceeded a predetermined threshold value set in the web browser, as described above. Determination of deletion candidates by the web browser and determination of their priorities are similar to those in the above-mentioned exemplary embodiments.

If an information processing terminal is a mobile terminal, in some cases, the mobile terminal may have a small data storage capacity not only for storing local storage data but also in its entirety. In a fourth exemplary embodiment, such a case is also considered.

More specifically, also in a case where applications other than a web browser that operate in the same terminal try to store desired data, the web browser determines whether local storage data is to be deleted. Then, as described in the above first to third exemplary embodiments, the local storage data determined to be the deletion candidate may be deleted in response to an instruction from a user or automatically. In other words, in the present exemplary embodiment, the local storage data can be deleted at a timing different from the timing when the local storage data is to be stored by the web browser.

In the first exemplary embodiment, as an example of a condition for extracting deletion candidates, the description has been given of an example related to deletion of a specific website included in a bookmark. In a fifth exemplary embodiment, simultaneously with an instruction to delete a website included in a bookmark, local storage data corresponding to the website is deleted together with the website, instead of being extracted as a deletion candidate.

Figure 8:
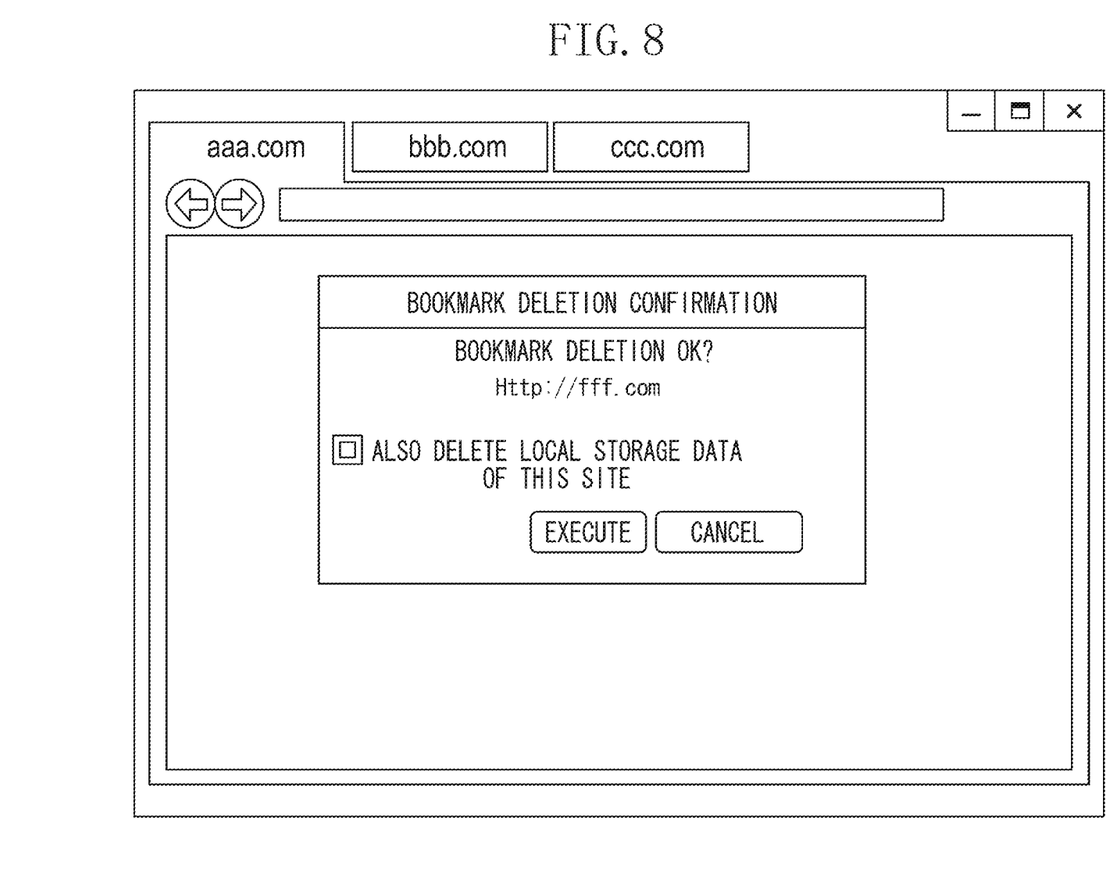
FIG. 8 illustrates an example of a UI for confirming deletion of local storage data.

FIG. 8 illustrates a screen provided to a user when a web browser deletes a website from a bookmark. On this screen, a user is prompted to select whether to delete local storage data corresponding to a website to be deleted, together with the website. If the local storage data is selected to be deleted, and a deletion execution button of the bookmark is pressed, the web browser 201 deletes the corresponding local storage data.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. It will of course be understood that this invention has been described above by way of example only, and that modifications of detail can be made within the scope of this invention.

This application claims the benefit of Japanese Patent Application 2014-091810 filed Apr. 25, 2014, and No. 2014-127539 filed Jun. 20, 2014, which are hereby incorporated by reference herein in their entirety.

What is claimed is:

1. An information processing terminal in which a web browser operates, the web browser having a WebStorage function of storing, as local storage data, data designated by a website into a storage area for the web browser, in response to calling of the website, the information processing terminal comprising:
  a memory storing instructions; and
  a processor which is capable of executing the instructions causing the information processing terminal to:
  store, into the storage area, data acquired according to description of a manifest file downloaded to the web browser in response to an access to a website, wherein the description designates data to be stored as the local storage data into a storage area for a web browser and the stored data is managed for origin corresponding to each website in the storage area;
  set conditions for determining a deletion candidate via a setting screen of the web browser;
  extract, from among local storage data stored in the storage area, local storage data as the deletion candidate according to the conditions set via the setting screen;
  present a screen including identification of the local storage data, which has been extracted as the deletion candidate, for each origin;
  delete the local storage data extracted as the deletion candidate from the storage area, in response to an instruction via the screen; and
  in a case where a page is deleted from a bookmark managed by the web browser, delete, from the storage area, local storage data corresponding to origin of a website providing the deleted page according to the conditions set via the setting screen, wherein the deleted local storage data is designated to be stored by description of a manifest file of the website providing the deleted page.

2. The information processing terminal according to claim 1, wherein the instructions further cause the information processing terminal to determine whether data designated by the website can be stored as local storage data in the storage area,
wherein the screen including the local storage data extracted as the deletion candidate is presented, in a case where it is determined that the data designated by the website cannot be stored in the storage area.

3. The information processing terminal according to claim 1, wherein the instructions further cause the information processing terminal to determine whether an amount of the data stored in the storage area exceeds a predetermined threshold value,
wherein the screen including the local storage data extracted as the deletion candidate is presented, in a case where it is determined that the amount of the stored data exceeds the predetermined threshold value.

4. The information processing terminal according to claim 1, wherein, according to a selection instruction via the screen, local storage data corresponding to the deletion candidate selected in the selection instruction is deleted from the storage area.

5. The information processing terminal according to claim 1, wherein the instructions further cause the information processing terminal to perform setting of automatically deleting the local storage data extracted as the deletion candidate,
wherein, in a case where the setting of automatically deleting the local storage data extracted as the deletion candidate is performed, the local storage data extracted as the deletion candidate is deleted from the storage area, without the screen being presented.

6. The information processing terminal according to claim 1, wherein the one or more conditions used for extracting the deletion candidate include at least any of a storage date of local storage data, a number of times of browsing of a website corresponding to the local storage data, a final browsing date of the website corresponding to the local storage data, and a data size of the local storage data.

7. The information processing terminal according to claim 1, wherein the one or more conditions used for extracting the deletion candidate include a condition under which local storage data designated to be stored by a website providing a page which is based on prefetching processing by the web browser and has no browsing history by a user is extracted as the deletion candidate.

8. The information processing terminal according to claim 1, wherein the one or more conditions used for extracting the deletion candidate include a condition under which local storage data designated to be stored by a website having a domain different from a domain of a page instructed by a user to be browsed via the web browser is extracted as the deletion candidate.

9. The information processing terminal according to claim 1, wherein the one or more conditions used for extracting the deletion candidate includes a condition under which local storage data serving as sessionStorage of the WebStorage function temporarily stored in the storage area is extracted as the deletion candidate, wherein the sessionStorage is different from Cookie.

10. The information processing terminal according to claim 1, wherein the one or more conditions used for extracting the deletion candidate include a condition under which local storage data designated to be stored by a website providing a page to be deleted from a bookmark managed by the web browser is extracted as the deletion candidate.

11. The information processing terminal according to claim 1,
wherein the instructions further cause the information processing terminal to present a screen via which an instruction for extending the storage area can be issued, and
wherein, in a case where the instruction for extending the storage area is issued via the screen, the web browser is configured to store the data designated by the website as local storage data into the extended storage area.

12. A control method based on a web browser having a WebStorage function of storing, as local storage data, data designated by a website into a storage area ensured for the web browser in a storage device, in response to calling of the website, the control method comprising:
storing, into the storage area, data acquired according to description of a manifest file downloaded to the web browser in response to an access to a website, wherein the description designates data to be stored as the local storage data into a storage area for a web browser and the stored data is managed for origin corresponding to each website in the storage area;
setting conditions for determining a deletion candidate via a setting screen of the web browser;
extracting, from among local storage data stored in the storage area, local storage data as the deletion candidate according to the conditions set via the setting screen;
presenting a screen including the local storage data, which has been extracted as the deletion candidate, for each origin;
deleting the local storage data extracted as the deletion candidate from the storage area, in response to an instruction via the screen; and
in a case where a page is deleted from a bookmark managed by the web browser, delete, from the storage area, local storage data corresponding to origin of a website providing the deleted page according to the conditions set via the setting screen, wherein the deleted local storage data is designated to be stored by description of a manifest file of the website providing the deleted page.

13. The control method according to claim 12, further comprising determining whether the data designated by the website can be stored as local storage data in the storage area,
wherein the screen including the local storage data extracted as the deletion candidate is presented, in a case where it is determined that the data designated by the website cannot be stored in the storage area.

14. The control method according to claim 12, further comprising determining whether an amount of the data stored in the storage area exceeds a predetermined threshold value,
wherein the screen including the local storage data extracted as the deletion candidate is presented, in a case where it is determined that the amount of the stored data exceeds the predetermined threshold value.

15. The control method according to claim 12, wherein, according to a selection instruction via the screen, local storage data corresponding to the selection instruction is deleted from the storage area.

16. The control method according to claim 12, further comprising performing setting of automatically deleting the local storage data extracted as the deletion candidate, wherein, in a case where the setting of automatically deleting the local storage data extracted as the deletion candidate is performed, the local storage data extracted as the deletion candidate is deleted from the storage area, without the screen being presented.

17. The control method according to claim 12, wherein the one or more conditions used for extracting the deletion candidate include at least any of a storage date of local storage data, a number of times of browsing of a website corresponding to the local storage data, a final browsing date of the website corresponding to the local storage data, and a data size of the local storage data.

18. The control method according to claim 12, wherein the one or more conditions used for extracting the deletion candidate include a condition under which local storage data designated to be stored by a website providing a page which is based on prefetching processing by the web browser and has no browsing history by a user is extracted as the deletion candidate.

19. The control method according to claim 12, wherein the one or more conditions used for extracting the deletion candidate include a condition under which local storage data designated to be stored by a website having a domain different from a domain of a page instructed by a user to be browsed via the web browser is extracted as the deletion candidate.

20. The control method according to claim 12, wherein the one or more conditions used for extracting the deletion candidate includes a condition under which local storage data serving as sessionStorage of the WebStorage function temporarily stored in the storage area is extracted as the deletion candidate, wherein the sessionStorage is different from Cookie.

21. The control method according to claim 12, wherein the one or more conditions used for extracting the deletion candidate include a condition under which local storage data designated to be stored by a website providing a page to be deleted from a bookmark managed by the web browser is extracted as the deletion candidate.

22. The control method according to claim 12,
wherein a screen via which an instruction for extending the storage area can be issued is presented, and
wherein, in a case where the instruction for extending the storage area is issued via the screen, the web browser stores the data designated by the website as local storage data into the extended storage area.

23. A computer-readable storage medium storing a computer program for causing a computer to execute a control method for a web browser having a WebStorage function of storing, as local storage data, data designated by a website into a storage area ensured for the web browser in a storage device, in response to calling of the website, the control method comprising:
storing, into the storage area, data acquired according to description of a manifest file downloaded to the web browser in response to an access to a website, wherein the description designates data to be stored as the local storage data into a storage area for a web browser and the stored data is managed for origin corresponding to each website in the storage area;
setting conditions for determining a deletion candidate via a setting screen of the web browser;
extracting, from among local storage data stored in the storage area, local storage data as the deletion candidate according to the conditions set via the setting screen;
presenting a screen including the local storage data, which has been extracted as the deletion candidate, for each origin;
deleting the local storage data extracted as the deletion candidate from the storage area, in response to an instruction via the screen; and
in a case where a page is deleted from a bookmark managed by the web browser, delete, from the storage area, local storage data corresponding to origin of a website providing the deleted page according to the conditions set via the setting screen, wherein the deleted local storage data is designated to be stored by description of a manifest file of the website providing the deleted page.

* * * * *